No. 641,013. Patented Jan. 9, 1900.
M. HEINEKE.
DRAG BELT FOR STRAW STACKERS.
(Application filed Aug. 5, 1899.)
(No Model.)
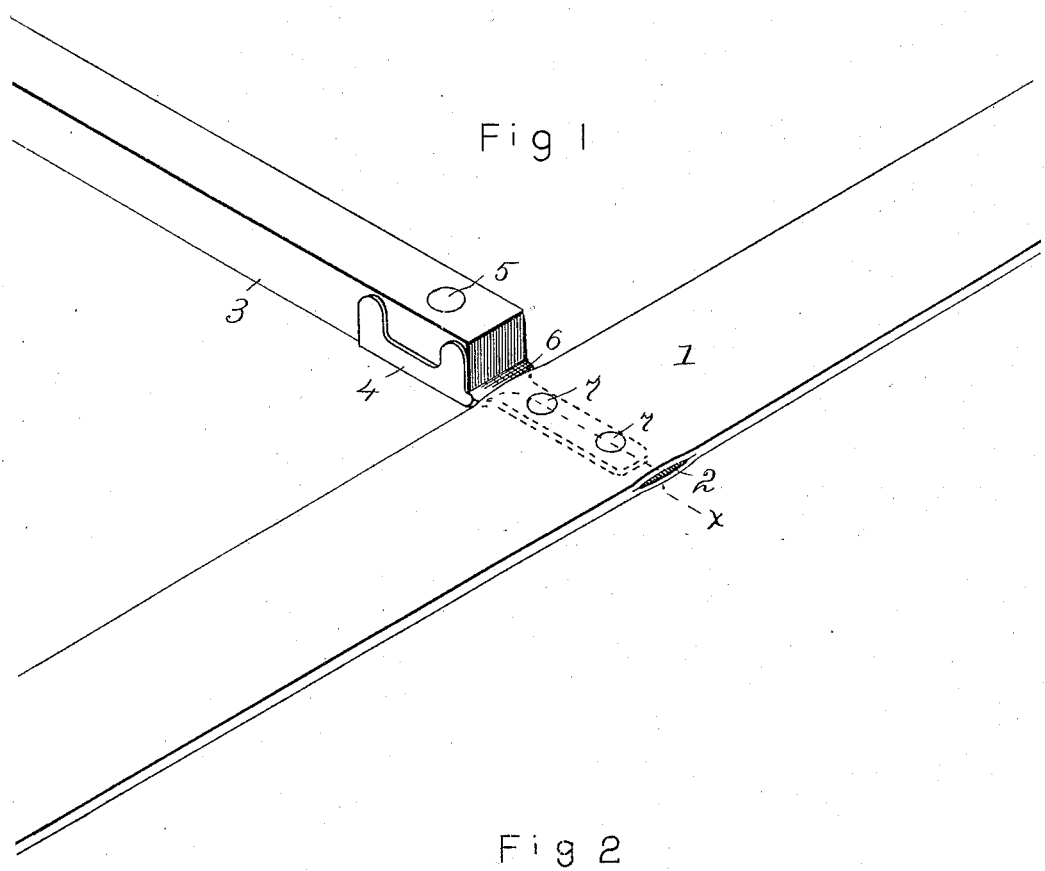
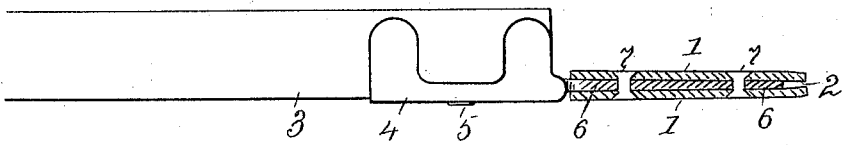
Attest,
Nora Graham.
Ina Graham.
Martin Heineke
by L. P. Graham
his attorney

UNITED STATES PATENT OFFICE.

MARTIN HEINEKE, OF SPRINGFIELD, ILLINOIS.

DRAG-BELT FOR STRAW-STACKERS.

SPECIFICATION forming part of Letters Patent No. 641,013, dated January 9, 1900.

Application filed August 5, 1899. Serial No. 726,274. (No model.)

*To all whom it may concern:*

Be it known that I, MARTIN HEINEKE, of the city of Springfield, county of Sangamon, and State of Illinois, have invented a certain new and useful Improvement in Drag-Belts for Straw-Stackers and the Like, of which the following is a specification.

This invention relates to drag-belts composed of side belts and cross-slats which are run both under and over guide-pulleys, so that both surfaces of the belts come in contact with the pulleys; and it is designed to provide means for connecting the slats with the belts without offering obstruction to the run of the belts around the guide-pulleys.

The invention is exemplified in the structure hereinafter described, and it is defined in the appended claim.

In the drawings forming part of this specification, Figure 1 is a perspective representation of an end of a slat and a fragment of belt, showing the slat fastened to the belt in accordance with my invention. Fig. 2 is a side elevation of the slat, showing the belt in cross-section on line $x$ in Fig. 1.

The belt 1 is an ordinary belt having sufficient flexibility to run freely around guide-pulleys, and it has a transverse incision at 2, which separates it for a short distance into two approximately equal layers. The slat 3 is of the ordinary or any desired construction, and it is connected with the belt by means of a clip 4, which is fastened to the slat and which has a plate or extension 6, that is inserted into the incision 2 of the belt and secured therein. The clip fits the end of the slat and is fastened thereto by means of a rivet 5, for instance. The extension or plate 6 is integral with the clip, and it extends parallel with the axis of the slat. It is secured in the incision of the belt by rivets 7. This connection leaves the bearing-surfaces of the belt practically unobstructed, and the extension 6 is narrow enough to not injuriously stiffen the belt and interfere with its travel around the guide-pulleys.

A complete drag-belt consists of a pair of side belts with which a number of slats are connected, and my invention relates solely for enabling the side belts to run around guide-pulleys impeded by the slats or the fasteners thereof.

What I claim is—

In a drag-belt, a side belt having a transverse incision, a cross-slat, and a clip on an end of the cross-slat having an extension fastened in the incision in the belt, substantially as set forth.

In testimony whereof I sign my name in the presence of two subscribing witnesses.

MARTIN HEINEKE.

Witnesses:
JAMES H. MATHENY,
MAY JENKINS.